United States Patent Office 3,217,252
Patented Nov. 9, 1965

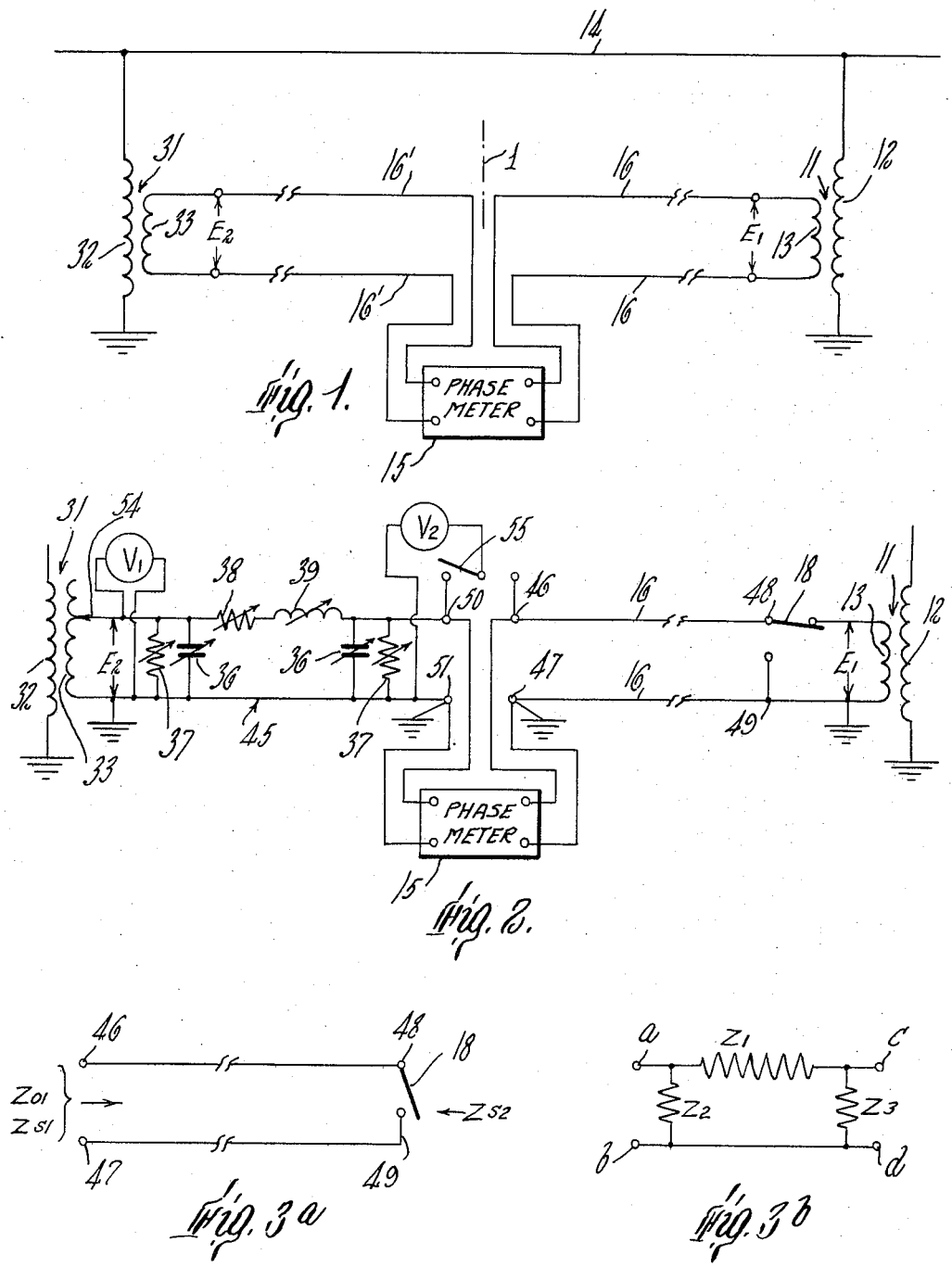

3,217,252
PHASE SENSING APPARATUS INCLUDING
PHASE COMPENSATING NETWORK
Edmund H. Povey, Medford, and Chester L. Dawes, Winchester, Mass., assignors to Doble Engineering Company, Belmont, Mass., a corporation of Massachusetts
Filed May 5, 1960, Ser. No. 26,998
10 Claims. (Cl. 324—83)

This invention relates generally to phase measurements, and more particularly it is concerned with the measurement of the phase relations between high voltages at widely spaced locations.

From measurements of the phase relations of high voltages appearing at various locations in an electrical power transmission system, it is often possible to deduce valuable facts concerning the operating characteristics of the system. Most such systems are of the three-phase type. Moreover, the construction and loading of the three phases is usually accomplished in symmetrical fashion so that a phase measurement dealing with one phase only is equally applicable to the other two phases. In making such measurements, practical considerations dictate that some form of voltage reducing device be used for connection to the high voltage. There are available for this purpose potential transformers and capacitor or bushing potential devices. The apparatus disclosed in Patents Nos. 2,922,951 and 2,922,952, issued in the names of Frank C. Doble (sole) and Edmund H. Povey and Chester L. Dawes (joint) on January 26, 1960, is likewise especially adapted to provide working voltages of reduced value to represent the high voltages.

If two such working voltages, $E_1$ and $E_2$, are at or very near the same location, their phase difference may be readily measured by means of a phase meter which is directly connected thereto. When the distance separating the locations at which the working voltages are derived becomes large, however, as is more apt to be the case in electrical power transmission systems, some form of communications medium must be employed to bring the two voltages together for comparison. By far the simplest and most reliable way to do this is with a metering circuit which makes use of a pair of conducting wires, such as a telephone circuit. The trouble with this arrangement is that the phase displacement produced by ordinary telephone lines, which are often the most convenient to use, is about two degrees per mile. This means that the phase shift produced by the metering circuit itself may greatly exceed the phase difference between the voltages under consideration.

The primary object of the present invention is to provide phase measuring apparatus for high voltages which overcomes the problem of the phase shift inherent in low-voltage transmission lines, such as telephone lines.

Another object of the invention is to provide phase measuring apparatus for high voltage applications which is convenient to use and which is adapted to provide highly accurate indications.

There are disclosed herein two embodiments of the invention. In one embodiment the phase measurement is made at the electrical center of the line constituting the metering circuit which transmits the two voltages for comparison, so that phase shift which one voltage $E_1$ undergoes to the electrical center is equal to the phase shift which the other voltage $E_2$ undergoes.

A phase meter connected to measure the phase difference between the two voltages transmitted to the center gives the phase difference between the two voltages as they appear at their respective points of origin. The second embodiment is an extension of the first in which a four-terminal network simulates the phase characteristics of the entire line of the metering circuit. One of the voltages $E_1$ is applied to the phase meter through the metering circuit and the other voltage $E_2$ is applied to the phase meter through the network. As in this first embodiment, the amount of phase shift which each of these two voltages undergoes to the point of measurement is the same and the phase meter provides a true indication of the phase relations of the voltages as they appear at their respective points of origin.

In the drawing:

FIG. 1 is a schematic diagram of a first embodiment of the invention;

FIG. 2 is a schematic diagram of a second embodiment of the invention;

FIG. 3a illustrates certain measurements performed on the transmission line of FIG. 2 in the determination of equivalent circuit components;

FIG. 3b illustrates a network equivalent of the transmission lines; and

Figure 4:
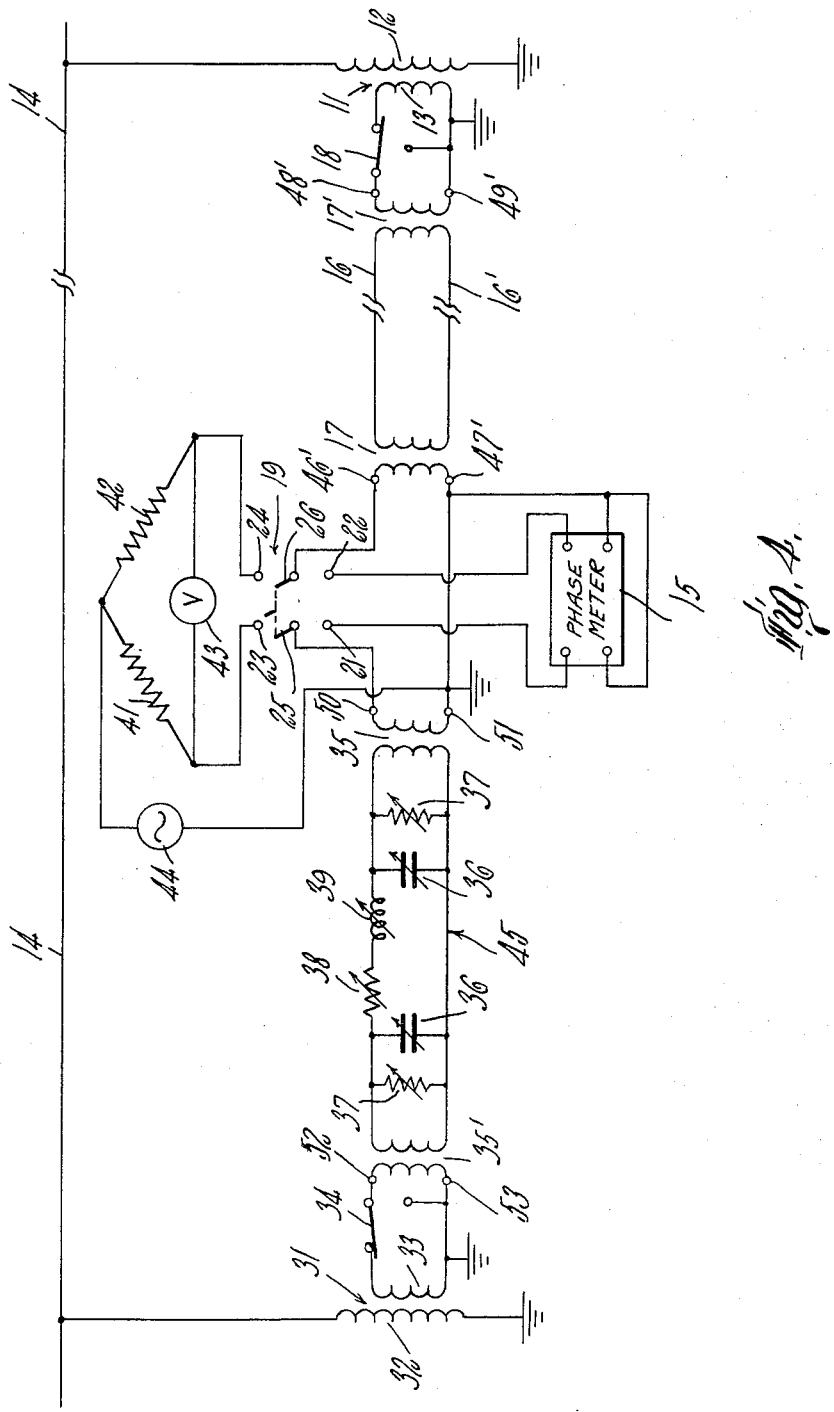
FIG. 4 is a schematic diagram of a modification of the circuit of FIG. 2 in accordance with the invention.

With reference now to the drawing, and more particularly to FIG. 1, it will be observed that the phase measuring apparatus of the invention includes by way of example a potential transformer 11 having a high voltage winding 12 and a relatively low voltage secondary winding 13. The primary is connected between a high voltage line 14 and ground, while the secondary furnishes a relatively low voltage $E_1$. The metering circuit is a low-voltage transmission line having conductors 16, 16 and 16' and 16'. The line is divided at its electrical center 1 at which a phase meter 15 is located. The low voltage $E_1$ is applied to one circuit of the phase meter 15 through the half 16, 16 of the metering circuit.

At the second location remote from the first, a potential transformer 31 having a high voltage winding 32 and a relatively low voltage secondary winding 33, is also connected between the high voltage line 14 and ground. The secondary winding also furnishes a relatively low working voltage $E_2$ which is applied to the second input circuit of the phase meter 15 through section 16', 16' which forms the second half of the metering circuit. Since the meter is located at the electrical center of the metering circuit, the electrical characteristics of the two halves, 16, 16 and 16', 16', are equal and the phase displacement of voltage $E_1$ to the center 1 of the metering circuit is equal to that of voltage $E_2$. Thus the phase meter provides a true indication of the phase relations between the two voltages as they appear at their point of origin.

It is within the contemplation of the invention that phase meter 15 may take any convenient form known to those skilled in the art although a preferred form is that described in Patent No. 2,923,879, issued February 2, 1960, in the name of Edmund H. Povey.

The center 1 of the transmission circuit usually is located physically remote from the location where the phase information is desired, such as at the switchboard room or at the load dispatcher's office. There are many well-known means for transmitting metering information, such as telemetering and television, so that the phase measurement indicated by phase meter 15 can be made readily available at switchboards and load dispatching centers at the power stations.

An objection to the embodiment just described is that the phase meter itself may be located remotely from the place where the phase information is desired such as at the switchboard or load dispatching office. This objection is overcome by employing a four-terminal network 45 which simulates the phase characteristics of the pair of long lines with which the metering circuit is formed. One of the voltages under consideration is now applied to the phase meter through the entire metering circuit 16, 16 as shown in FIG. 2. The other voltage under consideration is applied to the phase meter through the aforementioned network. Just as when the phase meter is located at the center of the metering circuit in FIG. 1, the amount of phase shift which each of the voltages undergoes through the network is the same as through the metering circuit so that the phase meter provides a true indiaction of the phase relation of the voltages as they appear at their respective points of origin.

In order to determine the proper values for the circuit elements with which the phase shift network is formed, three impedance measurements must be made on the metering circuit. First there must be an impedance measurement made at one pair of its terminals with the other pair open. Second, there must be a measurement made at one pair of terminals with the other pair short-circuited. The third measurement may be made at either pair of terminals with the other pair open or short-circuited so long as this latter measurement does not duplicate either of the first two as aforementioned. This is illustrated as follows:

FIGURE 3a shows the metering line with terminal pairs 46–47 and 48–49.

FIGURE 3b shows the equivalent network with terminal pairs $a$–$b$ and $c$–$d$, consisting of a series impedance $Z_1$ and the two shunt impedances $Z_2$ and $Z_3$. Let $Z_{01}$ be the impedance measured at terminals 46–47 with switch 18 open. Then $$Z_{01} = \frac{Z_2(Z_1+Z_3)}{Z_1+Z_2+Z_3} \text{ ohms}$$

Let $Z_{S1}$ be the impedance measured at terminals 46–47 with switch 18 closed, thus short-circuiting the far end of the line. Then $$Z_{S1} = \frac{Z_1 Z_2}{Z_1+Z_2} \text{ ohms}$$

Let $Z_{S2}$ be the impedance measured at terminals 48–49 with terminals 46–47 short-circuited. Then $$Z_{S2} = \frac{Z_1 Z_3}{Z_1+Z_3} \text{ ohms}$$

There are three unknown, $Z_1$, $Z_2$ and $Z_3$ and three equations which makes possible a solution giving the three unknowns, $Z_1$, $Z_2$, $Z_3$. If desired, a further impedance measurement at terminals 48–49 with terminals 46–47 open-circuited can be made.

This embodiment of the invention will become more apparent from the following detailed description and the drawing of FIGURE 2. As in FIGURE 1, the numerals 11 and 31 represent transformers having respective primaries 12 and 32, and secondaries 13 and 33 which step down the high voltage of line 14 (not shown) to the measurable low voltages $E_1$ and $E_2$. The entire metering circuit transmission line, represented by wires 16, 16 is coupled to the transformer secondary 13 which supplies the low voltage $E_1$. In this embodiment the voltage $E_2$ may be varied in value by means of a movable tap 54 having contact connections with some of the turns of the secondary 33. A voltmeter $V_1$ is connected to measure the voltage $E_2$ and a second voltmeter $V_2$ is connected between ground and the blade of single-pole, double-throw switch 55. By throwing the switch 55 to the left the voltmeter $V_2$ reads the voltage between the terminals 50, 51 of the network 45; by throwing the switch 55 to the right the voltmeter $V_2$ reads the voltage between terminals 46, 47 of the output end of the low-voltage transmission line 16, 16.

One circuit of the phase meter 15 is coupled to the pair of terminals 46, 47 of the transmission line 16, 16. The second circuit of the phase meter is coupled to the terminals 50, 51 of the network 45 which can conveniently be located near a switchboard or load dispatcher's office where the low voltage $E_2$, which is to be compared with $E_1$, is also located.

The second pair of terminals of the phase-shifting network 45, which is seen to be of pi configuration, are coupled to the secondary 33 of transformer 31. Each of its shunt arms is formed with the parallel combination of an adjustable capacitor 36 and adjustable resistor 37. These arms correspond to the two shunt impedances $Z_2$ and $Z_3$ of FIG. 3b. In the series arm of the network, which corresponds to the series impedances $Z_1$ of FIGURE 3b, there is an adjustable resistor 38 and an adjustable inductor 39.

More particularly, in operation the phase shifting network is adapted to simulate the transmission lines to the extent that the amount of phase shift introduced by the former is the same as that introduced by the latter. Under these conditions it follows that the voltages derived by the potential transformers will arrive at the phase meter in phase with each other if they are in phase to begin with at the potential transformer secondaries. If the working voltages as developed by the secondaries are out of phase by a predetermined amount, this amount will be reflected in the indication of the phase meter. As is apparent, therefore, the phase meter may be taken to indicate directly the relative phase difference between the high voltages at the points on the transmission line to which the potential transformers are connected.

In order to make impedance measurements with the terminals 48 and 49 open-circuited and short-circuited, the single-pole, double-throw switch 18 is provided as has already been described. Switch 18 also facilitates the rebalancing of the network to correct for changes in temperature which is described later.

Although a pi network is shown as simulating the metering transmission lines, it is well known to those skilled in the art that any pi network may be simulated by an equivalent T network and, likewise, there are other forms of networks that could be used to simulate equally well the transmission lines without departing from the scope of the invention. As has already been described, the various components for any of these network forms may be found by calculation based on the result of the impedance measurements.

It may be desired to know the value of the voltage $E_1$ by measurements made at the location at the end of the transmission circuit remote from $E_1$. The value of $E_1$ may be readily measured by adjusting the voltage $E_2$ by means of the tap 54 until the voltage between network terminals 50, 51 is equal to the voltage between terminals 46, 47 at the far end of the transmission circuit. The equality of the two voltages is readily determined by adjusting the tap 54 until the voltage between terminals 50, 51 measured when switch 55 is thrown to the left is equal to that across terminals 46, 47 when switch 55 is thrown to the right. The voltage drop in the network is then equal to the voltage drop in the transmission circuit so that voltage $E_2$ then becomes equal to voltage $E_1$ and the voltmeter $V_1$ then correctly reads the value of the voltage $E_1$. Since the phase angle between $E_1$ and $E_2$ is shown by the phase meter, the relation between the two voltages in both phase and magnitude is now known.

In practice, it is found that if the metering circuit transmission line, being of low voltage, is grounded as in FIGURE 2, the internal capacitances relative to ground become unbalanced and also stray ground currents may flow through the circuit. Both of these effects can produce erroneous results in the phase measurements, as will be shown later. To obviate these effects and isolate the circuit from ground, isolation transformers 17, 17' are provided as shown in FIGURE 4. The network 45 is more readily balanced and more symmetrical relative to the transmission line 16, 16 if it too is isolated from ground by two isolating transformers 35, 35'. These isolating transformers then form part of the circuits which they isolate and the transmission circuit may be considered as having the two pairs of terminals 46'–47' and 48'–49'; likewise the network may be considered as having the two pairs of terminals 50–51 and 52–53. In FIGURE 4, for simplicity the movable tap 54, the switch 55 and the voltmeters $V_1$ and $V_2$ and their connections all shown in FIG. 2, have been omitted. To one skilled in the art it is a simple matter to insert them if desired, with their connections in comparable positions in FIG. 4 so that they perform the same functions.

Also, in actual practice it will be found that the metering circuit and especially the transmission lines are necessarily subject to varying environmental conditions, such as changing humidity and temperature. These will have an effect on the impedance characteristics of the transmission lines and, in turn, their phase shift characteristics. Conversely, the phase shifting network will ordinarily be located indoors and hence it will not be subject to appreciable temperature and humidity changes, certainly not to the same extent as the transmission lines. Hence it will be necessary to compensate for the impedance variations in the transmission lines in order to obtain accurate phase measurements. A switch 19 and an impedance bridge provide a convenient method of doing this. Switch 19 is of the double-pole, double-throw type and hence it has four fixed terminals. These have been designated 21–24 in the drawing with the odd numbers having reference to the terminals served by a first switch arm 25, and the even numbers having reference to the terminals served by the second switch arm 26. As shown, switch arm 26 is connected to one end terminal 46' of a winding of the aforementioned isolation transformer 17 on its output side, while stationary terminal 22 is connected to one of the input terminals of the phase meter 15. Switch arm 25 is connected to one terminal 50 of the winding of the transformer 35 on its side away from the phase shifting network, while terminal 21 is connected to another of the input terminals of the phase meter. The remaining terminals of the phase meter are connected to ground along with the other ends of the output windings of transformers 17 and 35.

Finally it remains to describe the circuit associated with the terminals 23 and 24 of the switch 19. Connected in series between these two terminals are a pair of resistors 41 and 42 of identical value, and connected across the series combination of the resistors is a voltage detector 43. A voltage source 44 is applied between the junction of the resistors and ground, the source having a frequency which is substantially the same as the voltage on the line such as, for example, sixty cycles per second.

With the switch 19 in its upper position, that is, with arms 25, 26 in contact with terminals 23 and 24 respectively, the phase shifting network and the metering circuit, including the transmission lines, are connected to symmetrical arms of the bridge instead of being connected to the respective input circuits of the phase meter. The other two symmetrical arms of the bridge are formed by the resistors 41, 42. If switches 18 and 34 are now opened, that is, moved to their neutral positions, it will be possible to compare the open circuit impedances of the phase shifting network and the metering circuit. If the impedances do not agree, as reflected in an unbalanced indication by the meter 43, the parameters of the phase shifting network must be changed. Inasmuch as the open circuit impedance of the metering circuit will be primarily capacitive, a proper balance can generally be obtained simply by adjustment of capacitors 36. If switches 18 and 34 are now closed to their short-circuit positions, it will be possible to balance the short-circuit impedances of the phase shifting network and the metering circuit. Inasmuch as the short-circuit impedance of the metering circuit is primarily resistive, a balance can generally be obtained by adjustment of the resistor 38 in the phase shifting network. As soon as both the open and short-circuit impedances have been balanced in this way, it follows that the phase shift characteristics of the phase shifting network and of the metering circuit will have been brought into substantial agreement, which is as it should be to obtain a proper indication of the phase relation between the high voltages. Of course if a higher degree of precision is desired, impedance measurements may be made on both ends of the transmission line as previously described, and the network constants re-evaluated. Resistor 38 may be readjusted in the open circuit case and resistors 37 and capacitors 36 can be adjusted in the short-circuit case, and some adjustment of inductor 39 can also be made if necessary.

Those skilled in the art will appreciate that the invention is by no means limited to the use of potential transformers to derive low working voltages from high voltages. Most such devices that are suitable for this purpose have one of their output terminals grounded, however, and this is the reason that the isolation transformers are used. That is to say, without such transformers especially for the metering circuit, stray ground currents can flow between the grounded ends of the metering circuit whereby extraneous currents are introduced into the phase meter itself. Also with one side grounded, the metering circuit is unbalanced electrically and this unbalance is reflected in capacitive reactance to ground. This makes it more difficult to select the correct capacitance values in the phase shifting network. Finally, the isolating transformers serve to minimize interference from neighboring circuits. Although their impedances are included in the parameters of the transmission line and the phase shifting network, they will not ordinarily complicate the impedance matching procedure as aforementioned since they can be located indoors and hence will produce substantially equal amounts of phase shift.

Although the invention has been described in connection with several embodiments, those skilled in the art will recognize that the invention may take other forms suited to the particular phase measuring problem at hand. Similarly, the preferred embodiments illustrated are susceptible of various modifications that lie within the spirit and scope of the invention, several of which have been touched upon in the preceding description. Therefore, the invention should not be deemed to be limited to the details of what has been described herein by way of example but rather it should be deemed to be limited only to the scope of the appended claims.

What is claimed is:

1. Phase measuring apparatus for high voltages appearing at relatively widely spaced locations in an electrical power transmission system comprising means to derive a working voltage from a high voltage at a first location, a phase measuring device at a second location remote from said first location, said phase measuring device having a pair of input circuits, transmission lines to apply to a first of said input circuits the working voltage derived at said first location, said transmission lines producing a phase shift of the voltage derived at said first location, means to derive a working voltage from a high voltage at said second location, and a phase shifting network connected between said means to derive a working voltage from a high voltage at said second location and said phase measuring device to apply to the second of said input circuits the working voltage derived at said second location, said phase shifting network producing a phase shift of the voltage derived at said second location which is substantially equal to the phase shift produced by said transmission lines, so that said phase measuring device indicates the phase difference between the high voltages appearing at said relatively widely spaced locations without subjecting the signal transmitted over said transmission lines to attenuation by said phase shifting network.

2. Phase measuring apparatus for high voltages appearing at relatively widely spaced locations in an electrical power transmission system comprising means to derive a working voltage from a high voltage at a first location, a phase measuring device at a second location remote from said first location, said phase measuring device having a pair of input circuits, transmission lines to apply to a first of said input circuits the working voltage derived at said first location, said transmission lines producing a phase shift of the voltage derived at said first location, means to derive a working voltage from a high voltage at said second location, and a pi network connected between said means to derive a working voltage from a high voltage at said second location and said phase measuring device to apply to the second of said input circuits the working voltage derived at said second location, said pi network having dissipative shunt arms exhibiting capacitive reactance and a series arm exhibiting resistance and inductive reactance to produce a phase shift of the voltage derived at said second location which is substantially equal to the phase shift produced by said transmission lines, so that said phase measuring device indicates the phase difference between the high voltages appearing at said relatively widely spaced locations without subjecting the signal transmitted over said transmission lines to attenuation by said pi network.

3. Phase measuring apparatus for high voltages appearing at relatively widely spaced locations in an electrical power transmission system comprising means to derive a working voltage from a high voltage at a first location, a phase measuring device at a second location remote from said first location, said phase measuring device having a pair of input circuits, transmission lines to apply to a first of said input circuits the working voltage derived at said first location, said transmission lines producing a phase shift of the voltage derived at said first location, means to derive a working voltage from a high voltage at said second location, and a pi network connected between said means to derive a working voltage from a high voltage at said second location and said phase measuring device to apply to the second of said input circuits the working voltage derived at second location, said pi network consisting of an adjustable resistor and an adjustable capacitor disposed in parallel with the one another in each shunt arm of the network, and an adjustable resistor and an adjustable inductor disposed in series with one another in the series arm of the network to produce a phase shift of the voltage derived at said second location which is substantially equal to the phase shift produced by said transmission lines, so that said phase measuring device indicates the phase difference between the high voltages appearing at said relatively widely spaced locations without subjecting the signal transmitted over said transmission lines to attenuation by said pi network.

4. Phase measuring apparatus for high voltages appearing at relatively widely spaced locations in an electrical power transmission system comprising means to derive a working voltage from a high voltage at a first location, a phase measuring device at a second location remote from said first location, said phase measuring device having a pair of input circuits, transmission lines to apply to a first of said input circuits the working voltage derived at said first location, said transmission lines producing a phase shift of the voltage derived at said first location, means to derive a working voltage from a high voltage at said second location, a phase shifting network to apply to the second of said input circuits the working voltage derived at said second location, an impedance bridge having a pair of input circuits, and switch means optionally to isolate said transmission lines and said phase shifting network from the respective working voltages and from said phase measuring device while connecting them to the respective input circuits of said impedance bridge, said phase shifting network including means to adjust its impedance so that the phase shift of the working voltage at said second location produced by said phase shifting network will be substantially equal to the phase shift produced by said transmission lines.

5. Phase measuring apparatus for high voltages appearing at relatively widely spaced locations in an electrical power transmission system comprising means to derive a working voltage from a high voltage at a first location, a phase measuring device at a second location remote from said first location, said phase measuring device having a pair of input circuits, transmission lines to apply to a first of said input circuits the working voltage derived at said first location, said transmission lines producing a phase shift of the voltage derived at said first location, means to derive a working voltage from a high voltage at said second location, a phase shifting network to apply to the second of said input circuits the working voltage derived at said second location, an impedance bridge having a pair of input circuits, a first switch optionally to connect the respective input circuits of said impedance bridge to said phase shifting network and said transmission lines in place of the respective input circuits of said phase measuring device, and a second pair of switches optionally to short-circuit and to disconnect from said transmission lines and said phase shifting network the working voltages at said first and second locations, respectively.

6. Phase measuring apparatus for high voltages appearing at relatively widely spaced locations in an electrical power transmission system comprising means to derive a working voltage from a high voltage at a first location, a phase measuring device at a second location remote from said first location, said phase measuring device having a pair of input circuits, transmission lines to apply to a first of said input circuits the working voltage derived at said first location, said transmission lines producing a phase shift of the voltage derived at said first location, a first pair of isolation transformers coupling said first-named means and said first-named input circuit to the input and output ends of said transmission lines, means to derive a working voltage from a high voltage at said second location, a phase shifting network of pi configuration to apply to the second of said input circuits the working voltage derived at said second location, said network consisting of an adjustable resistor and an adjustable capacitor disposed in parallel with one another in each shunt arm of the network, and an adjustable resistor and an adjustable inductor disposed in series with one another in the series arm of the network, an impedance bridge having a pair of input circuits, a second pair of isolation transformers coupling said second-named means and said second-named input circuit to the input and output ends of said network, a first switch optionally to connect the respective input circuits of said impedance bridge to the isolation transformers at the output ends of said phase shifting network and said transmission lines in place of the respective input circuits of said phase measuring device, and a second pair of switches optionally to short-circuit and to disconnect from said transmission lines and said phase shifting network the working voltages at said first and second locations, respectively.

7. A phase measuring apparatus for high voltages appearing at first and second relatively widely spaced locations in an electrical power system comprising means to derive from a high voltage at said first location a first low working voltage of the same phase and in fixed ratio to the high voltage at said first location, a phase measuring device at a location remote from said first location for measuring the difference in phase between the high voltages at said first and second locations, said phase measuring device having a pair of input circuits, uncompensated transmission means to apply to a first of said input circuits the working voltage derived at said first location, said uncompensated transmission means producing a phase shift and attenuation in the working voltage derived at said first location as applied to said first input circuit, means to derive from a high voltage at said second location a second low working voltage of the same phase and in fixed ratio to the high voltage at said second location, and means including a compensating phase shifting network to apply to the second of said input circuits the working voltage derived at said second location, said compensating phase shifting network being adjusted so that the phase shift and attenuation between the working voltage derived at said second location and the voltage applied to said second of said input circuits is identical to the phase shift and attenuation produced by said uncompensated transmission means between the working voltage as derived at said first location and the voltage applied to the first of said input circuits so that said phase measuring device directly indicates the phase relation between the high voltages at said first and second locations notwithstanding the phase shift and attenuation introduced by said uncompensated transmission means without subjecting the signal transmitted over said transmission means to attenuation by said phase shifting network.

8. Apparatus for accurately measuring the difference in phase between voltages at two relatively widely spaced locations on a high voltage electrical system for use in combination with a two wire metering transmission line and a device at each location having two output terminals for providing a working voltage accurately related in phase to the high voltage on the electrical system at that point, comprising a phase meter for measuring the phase angle between two voltages applied thereto, first coupling means coupling said phase meter directly to the two terminals of said metering line at one end thereof, second coupling means coupling the working voltage applied by the device at one of said locations directly to the two terminals of said metering line at the other end thereof, a four terminal compensation network producing the same attenuation and phase shift as said metering line, third coupling means coupling two terminals of said compensation network directly to said phase meter, and fourth coupling means coupling the other two terminals of said compensation network directly to the working voltage providing device at said second location, so that said phase meter indicates the difference in phase between voltages at said two relatively widely spaced locations without subjecting the signal transmitted over said two wire metering transmission line to attenuation by said four-terminal compensation network.

9. The apparatus as claimed in claim 8 wherein each said coupling means includes an isolation transformer arranged so that no terminal of said compensation network nor either wire of said metering line is at ground potential.

10. Apparatus for accurately measuring the difference in phase between the voltages at two relatively widely-spaced locations on a high-voltage electrical system for use in combination with a two-wire metering transmission line and a device at each location having two output terminals for providing a working voltage accurately related in phase to the high voltage on the electrical system at that point, comprising a phase meter for measuring the phase angle between two voltages applied thereto, first coupling means coupling said phase meter directly to the two terminals of said metering line at one end thereof, second coupling means coupling the working voltage applied by the device at one of said locations directly to the two terminals of said metering line at the other end thereof, a four-terminal compensation network producing the same attenuation and phase shift as said metering line, said compensation network including adjustable resistance, inductance and capacitance components, an impedance sensing device, third coupling means to directly couple said impedance sensing device between the first two terminals of said compensation network and the two terminals of said metering line at said one end for providing an indication of changes in impedance between said compensation network and said metering line due to varying ambient conditions so that said resistance, inductance and capacitance components may be adjusted to cause said compensation network to produce the same change of phase angle as said metering line, and fourth coupling means coupling the other two terminals of said compensation network directly to the working voltage providing device at said second location.

References Cited by the Examiner
UNITED STATES PATENTS

| | | | |
|---|---|---|---|
| 1,894,338 | 1/33 | Austin | 324—87 X |
| 2,147,728 | 2/39 | Wintringham | 323—125 |
| 2,225,653 | 12/40 | Monk | 324—89 X |
| 2,283,676 | 5/42 | Kandoian | 324—87 X |
| 2,556,119 | 6/51 | Stribling | 324—87 |
| 2,874,350 | 2/59 | Maynard et al. | 324—87 X |
| 2,922,951 | 1/60 | Doble | 324—83 |
| 3,027,513 | 3/62 | Mulaney et al. | 324—89 X |

WALTER L. CARLSON, *Primary Examiner.*

SAMUEL BERNSTEIN, LLOYD McCOLLUM,
*Examiners.*